United States Patent [19]

Stoll

[11] Patent Number: 4,905,730

[45] Date of Patent: Mar. 6, 1990

[54] OVERRIDE CHECK VALVE

[75] Inventor: Kurt Stoll, Esslingen, Fed. Rep. of Germany

[73] Assignee: Festo KG, Esslingen, Fed. Rep. of Germany

[21] Appl. No.: 321,622

[22] Filed: Mar. 10, 1989

[30] Foreign Application Priority Data

Mar. 29, 1988 [DE] Fed. Rep. of Germany ....... 8804229

[51] Int. Cl.$^4$ .............................................. F16K 15/18
[52] U.S. Cl. ............................ 137/543.21; 251/63.4; 251/63.5; 251/82
[58] Field of Search ................... 251/63.4, 63.5, 82, 251/83; 137/543.21, 540

[56] References Cited

U.S. PATENT DOCUMENTS

| 2,736,338 | 2/1956 | Britton | 137/543.21 X |
| 2,997,851 | 8/1961 | Trubert | 251/63.4 X |
| 3,145,724 | 8/1964 | Pelzer | 137/543.21 X |
| 4,631,923 | 12/1989 | Smith | |

FOREIGN PATENT DOCUMENTS

| 682344 | 11/1952 | United Kingdom . |
| 726336 | 3/1955 | United Kingdom . |
| 815376 | 6/1959 | United Kingdom . |
| 922362 | 3/1963 | United Kingdom . |
| 2028974A | 3/1980 | United Kingdom . |
| 2133120A | 7/1989 | United Kingdom . |

Primary Examiner—Alan Cohan
Attorney, Agent, or Firm—Flynn, Thiel, Boutell & Tanis

[57] ABSTRACT

An override check valve comprising a valve housing in which a valve device is located which is made up of a valve member for opening and closing a valve port connecting first and second fluid ducts with each other. A valve closing spring urges the valve member into its closed setting. An operating device is arranged in an operation position of the valve in an upper housing part above the valve device and serves to switch over the valve member between the closed position and open position. An attachment part is arranged in this operation position on a lower part of the housing and serves to attach the valve to a component to be supplied with fluid under pressure, such attachment part having an outlet port in communication with the first duct. A connection part in the operational position is arranged laterally on the housing and has a through passage communicating on the one hand with a source of fluid under pressure or a receiving means therefor and a drain and on the other hand with the second duct, said valve device being arranged over the attachment part between the latter and the operating device, the connection part being generally opposite thereto laterally and the duct connected with the outlet port is divided into two consecutive duct sections, of which one first duct section arranged above the attachment part contains the valve device and the other second duct section adjoining same has a reduced cross section smaller than the first section, is free of any internal component and extends through the attachment part as far as the outlet port.

12 Claims, 2 Drawing Sheets

OVERRIDE CHECK VALVE

FIELD OF THE INVENTION

The invention relates to an override check valve that is to say a check valve which is provided with means for overriding it, and more particularly but not exclusively to such a valve comprising a valve housing in which a valve device is located which is made up of a valve member for opening and closing a valve port connecting first and second fluid ducts with each other and of a valve closing spring biasing the valve member into its closed setting, an operating device which is arranged in an operation position of the valve in an upper housing part above the valve device and which serves to switch over the valve member between the closed position and open position, an attachment part which is arranged in this operation position on a lower part of the housing a serves to attach the valve to a component to be supplied with fluid under pressure, such attachment part having an outlet port in communication wit the first duct, and a connection part which in the operation position is arranged laterally on the housing and which has a through passage communicating on the one hand with a source of fluid under pressure or a receiving means therefor and on the other hand with the second duct.

BACKGROUND OF THE INVENTION

Such check valves are used in pneumatic systems if it is necessary to ensure that the pressure at a piece of pneumatic equipment, caused by the supply of fluid under pressure thereto, is to be maintained even if the feed pressure drops. The most usual field of application is equipment in which reciprocating motion is caused by actuator cylinders and in the case of which safety measures have to be taken to see that, if the supply of pressure fluid is interrupted, the actuator cylinder is locked and is not for instance lowered so that a hazard would occur. Lowering or the release of pressure from the actuator should in fact only take place if venting is caused to occur by the check valve by intentional operation thereof.

The check valve is attached by means of its attachment part to the component that is to be supplied with fluid as for instance a cylinder actuator, the outlet port arranged thereon being in communication with a drive space in the component. The connection part may selectively be connected, more especially via a 2-way valve, with a source of fluid under pressure or a means receiving the fluid, as for instance the atmosphere or a vacuum. If the operating pressure is present at the connection part of the check valve the fluid will flow therethrough, since the pressure automatically moves the valve member against the thrust of the closing spring into the open setting so that the passage through the valve is opened up. If the feed pressure falls under a certain threshold as dependent on the spring constant of the closing spring, the valve member will be moved into its shut setting and the pressure in the said drive space will be maintained. The intentional venting of this drive space may then later be caused by the operation of the operating device, this being done manually or by a drive fluid. The operating device will more particularly switch over the valve member by mechanical action out of its closing setting into the open setting and the path for the return flow will be free. Such controlled or override control valves are also termed releasable check valves.

A disadvantage with the check valves so far proposed of the above type is that the reduction in size of the attachment part by the designer is limited. This size is determined by the dimensions of the valve device, which is located in a recess in the attachment plate.

Accordingly one object of the invention is to provide a check valve of the initially mentioned, in the case of which the overall size or dimensions of the attachment part may be further reduced without then impairing the proper function of the valve.

A still further object of the invention is to make this possible without increasing the overall dimensions of the valve.

SUMMARY OF THE INVENTION

In order to achieve these or other aims appearing from the present specification, claims and drawings, the valve device is arranged over the attachment part between the latter and the operating device, the connection part being generally opposite thereto laterally and the duct connected with the outlet port is divided into two consecutive duct sections, of which one first duct section arranged above the attachment part contains the valve device and the other second duct section adjoining same has a reduced cross section smaller than the first section, is free of any internal component and extends through the attachment part as far as the outlet port.

Thus while in the prior art a certain size of the attachment part was dictated by the valve device arranged inside it and such size was not able to be reduced to an unlimited extent, in the invention there is no longer such a design restriction. The valve device is removed from the attachment part, which now comprises a plain duct section in which there are no components of the valve device. The duct section extending through the attachment part is a plain duct for flow only. It is in this manner that is possible to readily design attachment parts with male threads of the order of M5. Since the valve device is transferred to the middle part of the housing, there is the beneficial effect that the overall size of the check valve is not made larger than the original form. Furthermore the arrangement of the connection part on the side of the housing may be adhered to so that the check valve in accordance with the invention may be utilized in lieu of prior art valves without the positions of the connection ducts having to be modified.

Advantageous further developments of the invention are defined in the claims.

One such development of the invention ensures that the seal is not damaged by the closing spring since the spring is accommodated in a seal carrier of the valve member and the transitional part between the two duct sections so that one end part of the valve closing spring may bear on the annular transitional step between the two duct sections. Furthermore it is then a simple matter to replace the seal if required without the seal carrier also having to be replaced. A further point is that this design makes special features unnecessary which would otherwise be required to accommodate the closing spring.

In accordance with one further development of the invention the seal carrier has an annular or other seal on its side facing away from the valve closing spring and the axially directed surface of this seal is smaller than the cross section of the duct section containing it, and preferably the cross section of the valve port is smaller than that of the first duct section, containing the valve device, of the second duct and the valve port is surrounded by an annular shoulder, which has a plane sealing surface extending normal to the longitudinal axis of the seal so that such sealing surface is opposite to a sealing collar of the seal projecting in the axial direction. The presence of a sealing edge in the form of a collar means that the sealing surface cooperating therewith and arranged on the housing does not have to have any elaborate shape which would be difficult to produce. It is in fact possible to have a simple planar surface able to be cheaply produced in order to form the sealing surface.

In accordance with a further preferred feature of the invention the seal carrier has a disk arranged coaxially in relation to the first duct section and having a disk surface smaller than the cross section area of the first duct section and on whose one disk side the seal is arranged, and on the lower side of the disk facing away from the seal it is preferred to arrange a plurality of guide wings, which are more particularly made integral and which are so placed that their radial outer surfaces forming guide surfaces engage the inner surface of the duct section containing them with a sliding fit. Furthermore the guide wings may be arranged to extend in the radial direction beyond the outer end of the disk of the seal carrier so that there is an annular flow gap, only interrupted by the guide wings, between such outer edge and the inner bore of the duct. These further possible features of the invention ensure optimum support and guiding of the seal carrier without there being any danger of its running skew and without any hindrance to the flow of fluid under pressure when the valve member is open.

A further feature of the invention the seal is the provision of an annular slip-on part which is detachably locked on a knob of the seal carrier having a peripheral groove so as to facilitate the fitting and replacement of the seal.

In accordance with a further development of the invention the first upper duct is in communication via at least one transverse hole in the housing with an annular duct, which is furthermore connected with the passage in the connection part and the annular duct coaxially surrounds the duct section having the valve device there, the outlet ports of the transverse holes in the housing being arranged in the annular duct at its upper axial end part and the outlet port of the passage is arranged at the lower axial end part of the annular duct. This arrangement involves simple design measures which make it possible for the position of the connection part in relation to the housing to be left unchanged.

The operating device may have a plunger which is arranged to slide in a hole in the housing and is more particularly operated by fluid power and has an operating part for moving the valve member into its open setting by acting on the member in the direction of operation and furthermore the plunger is provided with spring loading means to urge it in a direction opposite to its direction of operation into an initial position and the housing hole is provided with a screw thread in which a setting screw member is arranged against which the plunger bears in its initial position. These features a reliable fixation of the operating device even although the check valve has a small overall size.

The valve housing may be made with two housing parts of which one has a receiving opening in which the second housing part, which is more especially in the form of a male insert, is placed coaxially and the first duct section containing the valve device, of the duct is axially formed on the one hand by a collar in the receiving opening and on the other hand by the spaced opposite end part of the second housing part. These further features of the invention facilitate the production and the assembly of the valve in accordance with the invention.

BRIEF DESCRIPTION OF THE DRAWINGS

In what follows the invention will be described in more detail with reference to the accompanying drawings in which.

DETAILED DESCRIPTION

Figure 1:
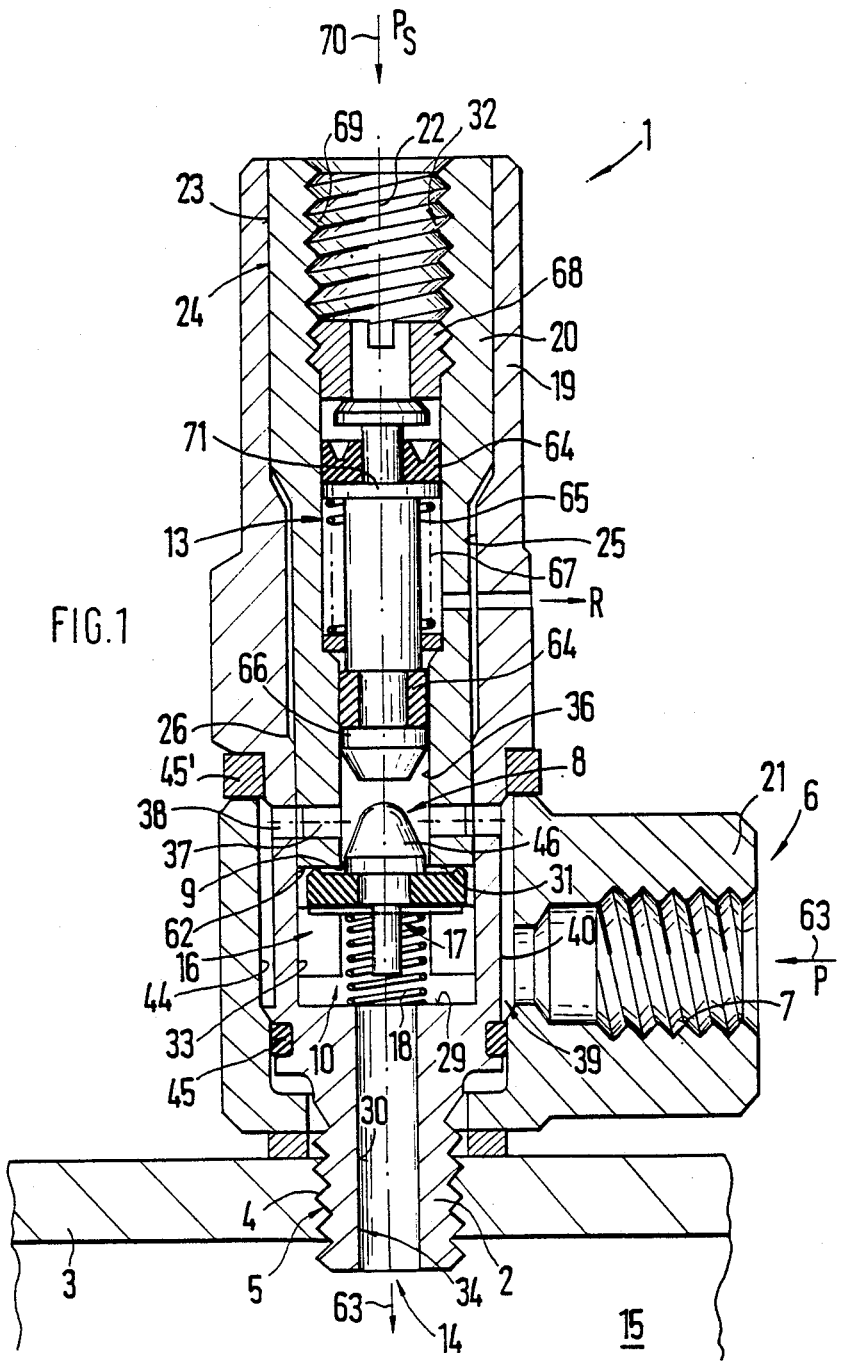
FIG. 1 is a longitudinal section of a first check valve in accordance with the present invention.

As shown in FIG. 1 the check valve in accordance with the invention is in a preferred position of use in which an attachment part 2, arranged on the valve housing 1, is located on the lower side of the valve. The ensuing account is on the assumption that the valve is in this position of use and words such as "above", "upper", "lower" and "below" are to be understood to refer to this position. It will be clear however that the valve may also be used in other positions.

As already mentioned, the check valve comprises a housing 1, on whose lower part an attachment part 2 is located, which the valve may be attached to a pneumatic component, a pneumatic system or the like, more especially so that the valve may be detached when desired. FIG. 1 shows a part of a wall 3 of a pneumatic component in the form of a cylinder actuator which has a threaded hole 4, into which a male thread 5 on the outer face of the attachment part is screwed. On the side of the housing 1 there is a connection part 6, which is able to be connected with a fluid pressure line or the like which is not shown in detail, so that a passage 7 in the connection part may be joined up with a supply of fluid under pressure or a means for receiving such fluid under pressure. The passage 7 is on the other hand in communication with a first duct 8 arranged in the interior of the housing and which is joined via valve port 9 with a second duct 10, which for its part opens on the lower end face of the attachment part 2 into the interior 15 of the pneumatic component (at 14) which is indicated.

A valve device 16 with a valve member 17 for opening and closing the valve port 9 is placed in the duct part formed by the two ducts 8 and 10. The valve device further comprises a closing spring IB, which urges the valve member 17 into the shut setting thereof. This closed setting is assumed by the valve member 17 if there is no pressure or only a very low pressure present at the passage 7. If however there is a sufficiently large pressure P at the passage 7, the pressure will take effect via the first duct 8 on the valve member 17 as well which is thus shifted and assumes it open setting, in which it clears the valve port 9 so that fluid may flow therethrough. Then the fluid under pressure may pass via the second duct 10 and the opening 14 into the interior 15 of the pneumatic component.

If now the feed pressure P falls either by design or because of some failure, so that the pressure assumes a value under the threshold necessary to keep the valve port open, the valve port 9 will be closed by the valve device 16 and the pressure in the interior space 15 will then be kept at a constant value, this being necessary in cases in which a sudden drop in the pressure obtaining in the interior space 15 would result in an undesired motion of the pneumatic component. It is only when an intentional reduction in the pressure level in the interior space 15 is desired that the valve device 16 may be opened, following which the interior space 15 will be vented in the reverse direction of flow via the passage 7.

The construction of the check valve in accordance with the invention will now be described in detail.

The housing 1 of the valve of the invention preferably consists of three housing parts 19, 20 and 21, this substantially simplifying the manufacture and assembly of the valve. The first housing part 19 is designed in the form of a hollow member and has a passage 23 extending in the longitudinal direction 22 from the top to the bottom. The passage is or may be considered to be divided up into a number of sections. At the top end there is a port section 24 with a large diameter adjoined by a middle section 25 at a position corresponding to around one third of the overall height where there is an oblique annular shoulder. In its middle part this middle section may have a small shoulder as indicated at 26. The middle section 25 of the passage also has a cylindrical bore and its axial end part adjacent to the attachment part 2 merges at an annular shoulder 29 with an end section 30, which has the opening 14 as already mentioned.

The two upper passage sections 24 and 25 represent a receiving opening for the second housing part 20, which is arranged coaxially therein and preferably takes the form of a press-fitted insert member. Its outline is shaped so as to correspond with the passage sections 24 and 25 and its axial length is however less than that of the two passage sections so that its end part 31 directed towards the attachment part 2 of the annular shoulder 29 between the passage sections 25 and 30 is opposite to the same with an axial clearance. Furthermore the inserted housing member 20 has a continuous longitudinal passage 32 in which, as will be explained later, the operating device 13 is arranged. It opens at the end part 31 into the part, placed between this part and the opposite annular shoulder 29, of the middle section 25, which forms a first duct section 33 of the above mentioned second duct 10. The opening at the same time constitutes the valve port 9. The end section 30 adjoining this first duct section 33 represents a second duct section 43 of above mentioned second duct 10.

The important feature in this connection is that the valve device 16, as seen in the axial direction 22 in the first duct section 33, is arranged after the attachment part 2 and is located between the attachment part 2 and the operating device. In this respect the connection part 6 is laterally generally opposite to it. The lower second duct section 34 extends through the attachment part 2 in the longitudinal direction completely and constitutes a plain duct, in which no components are arranged. It is in this manner that the dimensions of the attachment part as measured in a direction across the longitudinal direction 22 may be kept very small and it is only necessary to take into account the fact that the second duct section 34 has a cross section which is adequate for the flow rate to be expected.

In the present working example of the invention the attachment part 2 has the male thread 5 extending along most of its length and practically constitutes a screw-in plug.

The first duct 8 is made up of a number of parts, the first of which is a hole section 36, adjoining the valve port 9, of the longitudinal passage 32, which is terminated at its top end by the operating device 13, By way of a number of transverse holes 37 extending through the housing part 20 and of further transverse holes 38 aligned therewith in the outer housing part 29, the hole section 36 is connected with an annular space 39. The annular space is delimited by a longitudinal section 40 of the cylindrical outer face of the outer housing part 19 and by the inner surface 44 of a widened part of the third housing part 21 surrounding the second housing part 19 like a cuff. Suitable housing seals are indicated at 45 and 45'. The annular space or duct 39 is connected with the passage 7, which extends through the plug-like, projecting connection part 6 of the housing part 21.

Figure 2:
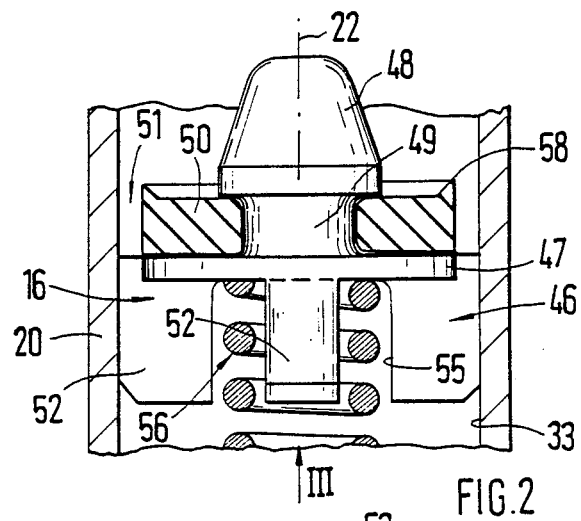
FIG. 2 is a view of part of the valve depicted in FIG. 1 on a larger scale and centered on the valve device.
Figure 3:
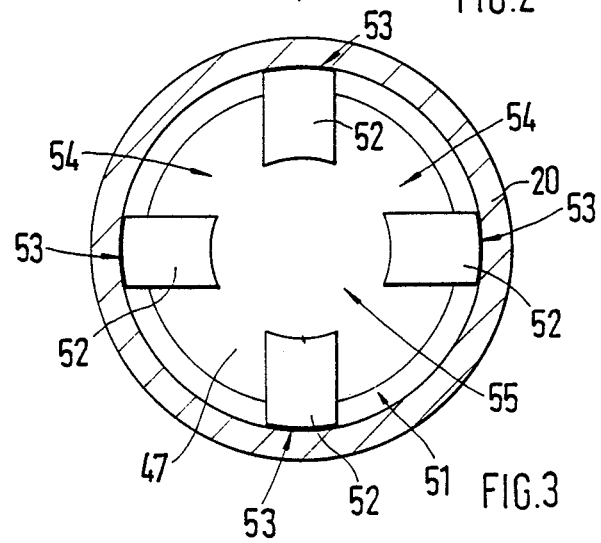
FIG. 3 is a view of the valve device looking in the direction marked III in FIG. 2.

As will be more especially seen from FIGS. 2 and 3, the valve device 16 contains a seal carrier 46 arranged in the duct section 33 and which has a disk 47 defining a plane arranged at a right angle to the longitudinal axis 22. The area of the disk is less than the cross section area of the duct section 33 and on the side facing the operating device 13 there is a central knob 48 extending into the passage 32 when the valve is in the closed setting, such knob being more especially integral. In the part adjacent to the disk it is provided with a peripheral groove 49, into which a sealing ring 50 is inserted, its outline being generally the same as the outline of the disk 47. As seen in the axial direction there is accordingly an annular gap 51 for flow of the fluid between the outer periphery of the seal 50 and the bore of the first duct section 33.

In order to guide and steady the disk there are a number of preferably integral guide wings 52 on the side of the disk facing away from the knob 48. Preferably the wings 52 are arranged with an equal spacing about the axis of the disk and project in the radial direction beyond the disk so that at their radially outer ends they have a curved guiding surface 53 which is adapted to the curvature of the surface of the duct section 33. As seen in the circumferential direction there are flow gaps 54 between the individual wings 52 so as to constitute a connection between the annular gap 51 and a spring accommodating space 55. This spring space 55 is arranged coaxially in relation to the knob 48 and is located on the side of the disk turned away from it, its outer periphery being delimited in sections by the radially inward face of the individual wings 52. The spring space 55 is furthermore open towards the attachment part 2 and contains an end part 56 of the valve closing spring 56 which is more especially in the form of a helical spring. This end 56 of the spring bears on the disk 47, while its other end acts on the annular shoulder which is formed by the transitional zone between the two duct sections 33 and 34 which are coaxial to each other.

The individual guide wings 52 have a certain axial extent, the axial dimension corresponding to the length thereof, plus the thickness of the sealing ring and plus the thickness of the disk being less than the clearance width, measured in the axial direction, between the end part 31 and the shoulder 29. Since the wings 52 are arranged with a running play in the duct section 33, the result is thus mobility of the unit made up of the seal carrie 46 and the seal 50.

On its axial side turned towards the end part 31 the annular seal 50 is provided with an annular sealing edge, that is to say a sealing collar 58 which in the closed setting of the valve member cooperates with the end part 31, which is preferably in the form of a flat sealing surface extending in a direction normal to the longitudinal axis 22. Thus in the closed setting the sealing collar 58 bears against this sealing surface 62 so that the passage of fluid through the valve opening 9 or port is interrupted.

If a fluid under a feed pressure P is supplied to the passage 7, it will act on the sealing ring 50, the effect area being increased by the sealing collar 58 which ensures a clearance from the sealing surface 62. If the pressure is sufficient the sealing ring 50 is moved clear of the sealing surface 62 and there will be a flow of the fluid as marked by the arrow 63. A drop in pressure from this pressure level will lead to an immediate closing of the valve port 9.

In order to make it possible for the valve member 17 to be shifted into the open setting even if there is no feed pressure, the operating device 13 is provided. It comprises a plunger 65 guided for sliding motion in the longitudinal direction 32 and provided with seals 64. On the axial end of the plunger 65, which is adjacent to the attachment part 2 there is an operating part 66. By means of a spring 67 bearing on the housing part 20 the plunger 65 is urged into its neutral or resting position, in which its operating part 66 is spaced axially from the knob 48 of the seal carrier 46. The counter abutment for the spring is in the form of an annular setting nut 68 provided with an external screw thread and a central hole 68A therethrough, and which external screw thread engages a female thread 69 in the longitudinal passage 32 so that adjustment thereof is possible. Owing to the provision of a setting nut it is possible to ensure that even although the valve is made with the smallest possible dimensions there is a reliable opposite abutment for the plunger 65. The reliability is substantially greater than in the case of the use of clip rings or the like, which when made With small sizes are readily bent and do not securely fasten the parts.

The female thread 69 may simultaneously function to connect a control line via which a pressure Ps may be supplied, such fluid under pressure being able to act through the hole 68A in the setting nut 68 on the plunger 65 when required and consequently causes motion towards the attachment part 2. The attachment part 66 will engage the knob 48 and will move the sealing ring 50 clear of the sealing surface 62. Thus the valve device will be mechanically unlatched and it is possible for return flow of the fluid under pressure in the interior space 15 to take place in a direction opposite to the arrow 63.

At 71 a part of the plunger is indicated functioning as a piston and which ensures that the plunger may be moved by the fluid.

The check valve in accordance with the invention makes it possible to miniaturize the design so that attachment part 2 has a very small size. It is for instance possible to provide the attachment part 2 with male threads 5 of the order of size of M4 or M5, respectively, this not having been possible in the case of check valves of this type in the past.

A further advantage is that in the check valve in accordance with the invention the connection part 6 and the attachment part 2 have the same positions as in known valve designs so that the connection features are unchanged. It is furthermore an advantage in this respect that the transverse holes 37 and 38 in the housing open in the upper part and the passage 7 opens in the axial lower part into the annular space and, respectively, the annular duct 29. This leads in practice to a bypassing of the duct section 33.

The embodiments of the invention in which an exclusive property or privilege is claimed are defined as follows:

1. An override check valve, comprising:

valve housing means having first, second and third housing sections, a valve control means in said first housing section, an inlet port means in said second housing section and first connecting means for facilitating connection of said inlet port means to a source of fluid pressure and an outlet port means in said third housing section and second connecting means for facilitating connection of said outlet port means to a component to be supplied with fluid under pressure;

passageway means for providing fluid communication through said valve housing means and between said inlet port means and said outlet port means;

first means defining a valve chamber in said passageway means, a normally closed valve means in said valve chamber means for blocking fluid communication between said inlet port means and said outlet port means in response to a lack of fluid pressure applied to said inlet port means and for opening said fluid communication between said inlet port means and said outlet port means in response to the presence of fluid pressure being applied to said inlet port means, said valve means being supported for movement relative to said valve housing means toward said first housing section to effect a closing of said valve means to block said fluid communication and away from said first housing means to effect a opening of said fluid communication, said first housing section and said valve control means being arranged on a side of said valve means remote from said third housing section and said outlet port means, said valve control means including manually operable reciprocal plunger means supported for reciprocal movement between first and second positions, said first position being spaced from said valve means, said second position being in engagement with said valve means to effect an initial controlled opening of said valve means during a time that said inlet port means lacks pressurized fluid being applied thereto so as to facilitate a flow of fluid through said valve means, said valve means being in axial alignment with said valve control means and said reciprocal movement of said valve control means and said valve means are in the same direction; and said passageway means including means defining an annular space encircling at least one of said valve control means and said valve chamber means and freely communicating with said inlet port means and a side of said valve means which opposes said valve control means, said first connecting means being in radial alignment with said valve means and having a longitudinal axis that extends perpendicularly to said direction of reciprocal movement of said valve control means and said valve means.

2. An override check valve, comprising:

valve housing means having first, second and third separate housing pieces, said first and second housing pieces both being an elongated part having a first and second openings respectively, therethrough;

valve seat means provided adjacent one end of said first housing piece;

valve control means supported for reciprocal movement in said first opening in said first housing piece between first and second positions toward and away from, respectively, said valve seat means, said first housing piece being received in said second opening of said second housing piece at one end thereof, said second housing piece having means defining an outlet port at an end remote from said one end thereof;

means on both of said first and second housing pieces defining a valve chamber, a first interior surface of said valve chamber having said valve seat means thereon, a second interior surface of said valve chamber means having said outlet port means thereon;

a valve member reciprocally mounted in said valve chamber means for movement toward and into engagement with said valve seat means as well as away therefrom;

resilient means for urging said valve member into engagement with said valve seat means, said third housing piece having means defining a bore with sidewalls and a bottom wall, said bottom wall having an opening therethrough, said bore receiving said second housing piece therein with said outlet port means thereof extending through said opening in said bottom wall, said third housing piece also having means defining an inlet port to said check valve;

first passageway means in said first and second housing pieces and communicating with said first opening in said first housing piece at a location that is intermediate said valve control member and said valve seat means;

means defining a second passageway in at least said third housing piece for providing fluid communication between said inlet port means and said first passageway means; and seal means between the respective first, second and third housing pieces for preventing leakage from said check valve;

whereby application of a pressurized fluid to said inlet port means will cause said valve member to move away from said valve seat means to facilitate a supply of fluid to said valve chamber means and thence said outlet port means.

3. The check valve as claimed in claim 2, wherein said second housing piece has a male threaded plug with said outlet port means extending through it in the longitudinal direction of said second housing piece.

4. The check valve as claimed in claim 2, wherein said first passageway means includes a passageway in each of said first and second housing pieces and are arranged coaxially in relation to each other.

5. The check valve as claimed in claim 2, wherein resilient means is arranged in said valve chamber means between said valve member and said second interior wall.

6. The check valve as claimed in claim 5, wherein said valve member has a seal carrier with an axially directed annular seal on a side facing away from said resilient means and an axially directed surface of this seal being smaller than the cross section of said valve chamber means containing it, a cross section of a portion of said first passageway means opening into said valve chamber means being smaller than that of said valve chamber means and said annular seal being surrounded by an annular shoulder having a plane sealing surface extending normal to the longitudinal axis of said seal.

7. The check valve as claimed in claim 5, wherein said valve member has a seal carrying disk arranged coaxially in relation to a portion of said first passageway means opening into said valve chamber means and a disk surface thereon which is smaller than the cross section area of said valve chamber means and on whose one disk side a seal is arranged, and on the other side of the disk facing away from said seal is arranged a plurality of guide wing integral therewith and are so placed that their radially outer surfaces form guide surfaces which slidingly engage an interior surface of said valve chamber means with a sliding fit.

8. The check valve as claimed in claim 7, wherein said guide wings are arranged to extend in the radial direction beyond the outer periphery of said disk of said seal carrier so that there is an annular flow gap, only interrupted by said guide wings, between such outer periphery and the interior walls of said valve chamber means.

9. The check valve as claimed in claim 7, wherein a spring accommodating space, opening towards said outlet port means, is provided between said guide wings, wherein said resilient means is a valve closing spring, and wherein one end of said valve closing spring is mounted in said spring accommodating space.

10. The check valve as claimed in claim 5, wherein said valve member has a stem and seal in the form of an annular slip-on part which is detachably secured to said stem, said stem having a peripheral groove therein.

11. The check valve as claimed in claim 2, wherein said means defining a second passageway includes an annular chamber, said annular chamber coaxially surrounding said valve chamber means having said valve member therein, said first passageway means being arranged at one axial end of said annular chamber.

12. The check valve as claimed in claim 2, wherein said valve control means includes a plunger which is arranged to slide axially in said first opening in said first housing part and is adapted to be operated by fluid power, said plunger having an operating part for moving said valve member into an open setting spaced from said valve seat means by acting on said valve member in the direction of operation, and wherein said plunger is provided with spring loading means to urge it in direction opposite to its direction of operation into an initial position, and wherein said first opening is provided with an internal screw thread in which a setting screw member is arranged and against which said plunger bears in its initial position.

* * * * *